US00RE39795E

(19) United States
(12) Reissued Patent
Wright

(10) Patent Number: US RE39,795 E
(45) Date of Reissued Patent: Aug. 28, 2007

(54) CLOTHING IRON WITH DETACHABLE LIGHT ASSEMBLY

(75) Inventor: Jean M. Wright, 2612 Aylesbury Ct., Louisville, KY (US) 40242

(73) Assignee: Jean M. Wright, Louisville, KY (US)

(21) Appl. No.: 10/898,723

(22) Filed: Jul. 26, 2004

Related U.S. Patent Documents

Reissue of:
(64) Patent No.: 6,665,963
Issued: Dec. 23, 2003
Appl. No.: 10/323,523
Filed: Dec. 18, 2002

U.S. Applications:
(60) Provisional application No. 60/399,487, filed on Jul. 29, 2002.

(51) Int. Cl.
*D06F 75/00* (2006.01)
*D06F 75/08* (2006.01)
*F21V 33/00* (2006.01)
D06F 75/30

(52) U.S. Cl. ..... 38/94; 362/117
(58) Field of Classification Search ..... 38/74, 38/75, 77.7, 82, 88, 93, 94; 362/117, 505, 362/555, 559, 577, 90, 253; D26/62; 446/474; 219/228, 249, 250, 254, 258
See application file for complete search history.

(56) References Cited

U.S. PATENT DOCUMENTS 1,010,092 A * 11/1911 Thomas ..... 219/249
1,195,193 A * 8/1916 Feyes ..... 362/117
1,293,010 A * 2/1919 Bloch ..... 219/249
1,522,838 A * 1/1925 Reh et al. ..... 219/248
1,684,742 A * 9/1928 Picklesimer ..... 362/117
2,179,890 A * 11/1939 Kaplan ..... 219/258
D118,146 S * 12/1939 Fitzgerald ..... D32/70
2,222,327 A * 11/1940 Walkup ..... 219/245
2,271,371 A * 1/1942 Harding ..... 362/117
2,357,905 A * 9/1944 Olving ..... 38/81
2,382,101 A * 8/1945 Saffady ..... 362/117
2,395,584 A * 2/1946 Saffady ..... 362/577
2,439,059 A * 4/1948 Saffady ..... 362/117
2,497,744 A * 2/1950 Sorkin ..... 446/474
3,676,950 A * 7/1972 Clarke ..... 446/474
4,029,935 A * 6/1977 Archer et al. ..... 219/228
D312,276 S * 11/1990 Fisherman et al. ..... D19/26
5,250,139 A * 10/1993 Hall ..... 156/379
6,095,074 A * 8/2000 Reinhardt ..... 114/219

* cited by examiner

*Primary Examiner*—Ismael Izaguirre

(57) ABSTRACT

A clothing iron with detachable light assembly that includes a clothing iron assembly and a detachable light assembly secured to the forward end of the clothing iron assembly. The detachable light assembly being is shaped to seat into a light assembly mating recess of the clothing iron when the plug of the light assembly is inserted into the jack of the iron assembly. The light assembly has a number of high intensity bulbs spaced there along to direct high intensity illumination onto an item being ironed.

3 Claims, 3 Drawing Sheets

CLOTHING IRON WITH DETACHABLE LIGHT ASSEMBLY

Matter enclosed in heavy brackets [ ] appears in the original patent but forms no part of this reissue specification; matter printed in italics indicates the additions made by reissue.

This application claims benefit of Provisional Application Ser. No. 60,399/487 filed Jul. 29, 2002.

TECHNICAL FIELD

The present invention relates to clothing irons and more articularly to a clothing iron with detachable light assembly that includes a clothing iron assembly and a detachable light assembly secured to the forward end of the clothing iron assembly; the clothing iron assembly having a light assembly mating recess at a forward end thereof having a jack in connection therewith; the detachable light assembly being shaped to seat into the light assembly mating recess and having a plug extending therefrom that is positioned to electrically engage the jack of the iron assembly when the detachable light assembly is seated in the light assembly mating recess; the light assembly having a number of high intensity bulbs spaced there along so as to direct additional illumination onto an item being ironed.

BACKGROUND ART

Ironing clothing articles is often necessary to give the clothing articles the clean crisp look that many wearer's desire. Ironing clothing items can be tiring because it is important to position the iron onto wrinkled areas for a sufficient period to remove the wrinkles but not long enough to cause damage to the clothing article. Because the use of bright lighting can often eliminate the need for reading glasses by many individuals who require them in low ambient light to read or see things at a close distance, it would be a benefit to have an iron that included a detachable light source having a number of high intensity lights for providing high intensity light onto the article to be ironed. It would be a further benefit to have such an iron that included an adjustably positionable light source, such as a light mounted to the end of a goose-neck support, so that the user could direct the light where it was most needed or wanted.

GENERAL SUMMARY DISCUSSION OF INVENTION

It is thus an object of the invention to provide a clothing iron with a detachable light assembly that includes a clothing iron assembly and a detachable light assembly secured to the forward end of the clothing iron assembly; the clothing iron assembly having a light assembly mating recess at a forward end thereof having a jack in connection therewith; the detachable light assembly being shaped to seat into the light assembly mating recess and having a plug extending therefrom that is positioned to electrically engage the jack of the iron assembly when the detachable light assembly is seated in the light assembly mating recess; the light assembly having a number of spaced high intensity bulbs so as to direct additional illumination onto an item being ironed.

Accordingly, a clothing iron with detachable light assembly is provided. The clothing iron with detachable light assembly includes a clothing iron assembly and a detachable light assembly secured to the forward end of the clothing iron assembly; the clothing iron assembly having a light assembly mating recess at a forward end thereof having a jack in connection therewith; the detachable light assembly being shaped to seat into the light assembly mating recess and having a plug extending therefrom that is positioned to electrically engage the jack of the iron assembly when the detachable light assembly is seated in the light assembly mating recess; the light assembly having a number of spaced apart high intensity bulbs to direct additional illumination onto an item being ironed. In a preferred embodiment, a detachable light is provided on an iron that includes a gooseneck user bendable light support.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
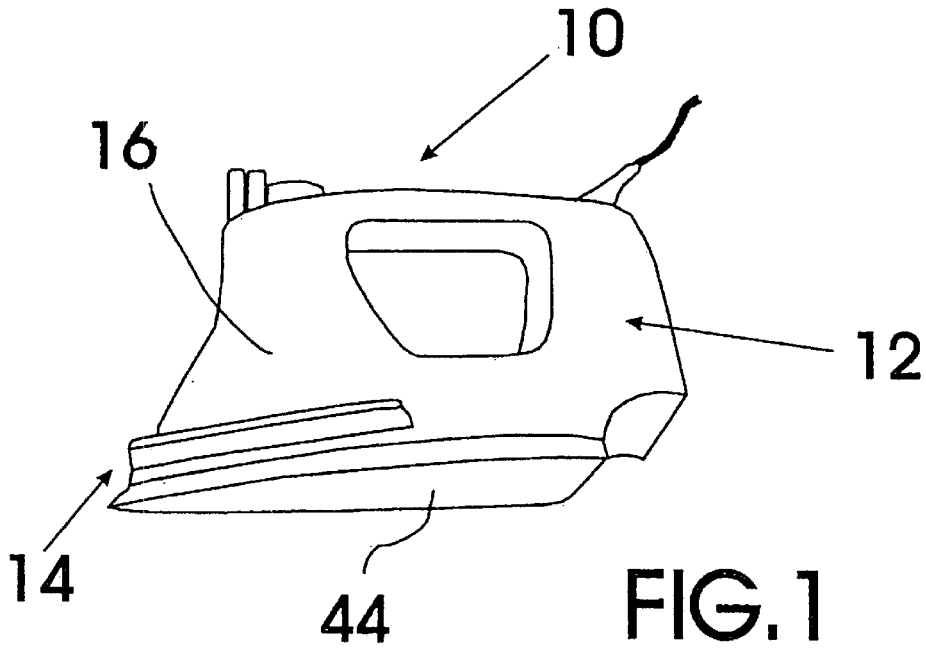
FIG. 1 is a perspective view of an exemplary embodiment of the clothing iron with detachable light assembly of the present invention showing the clothing iron assembly with the detachable light assembly secured to the forward end of the clothing iron assembly.
Figure 4:
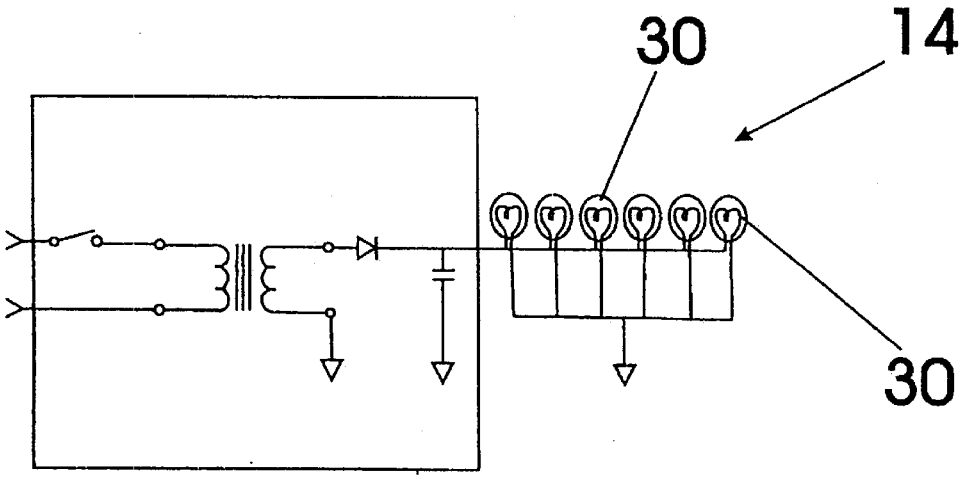
FIG. 4 is a schematic diagram of the clothing iron with detachable light assembly of FIG. 1.
Figure 2:
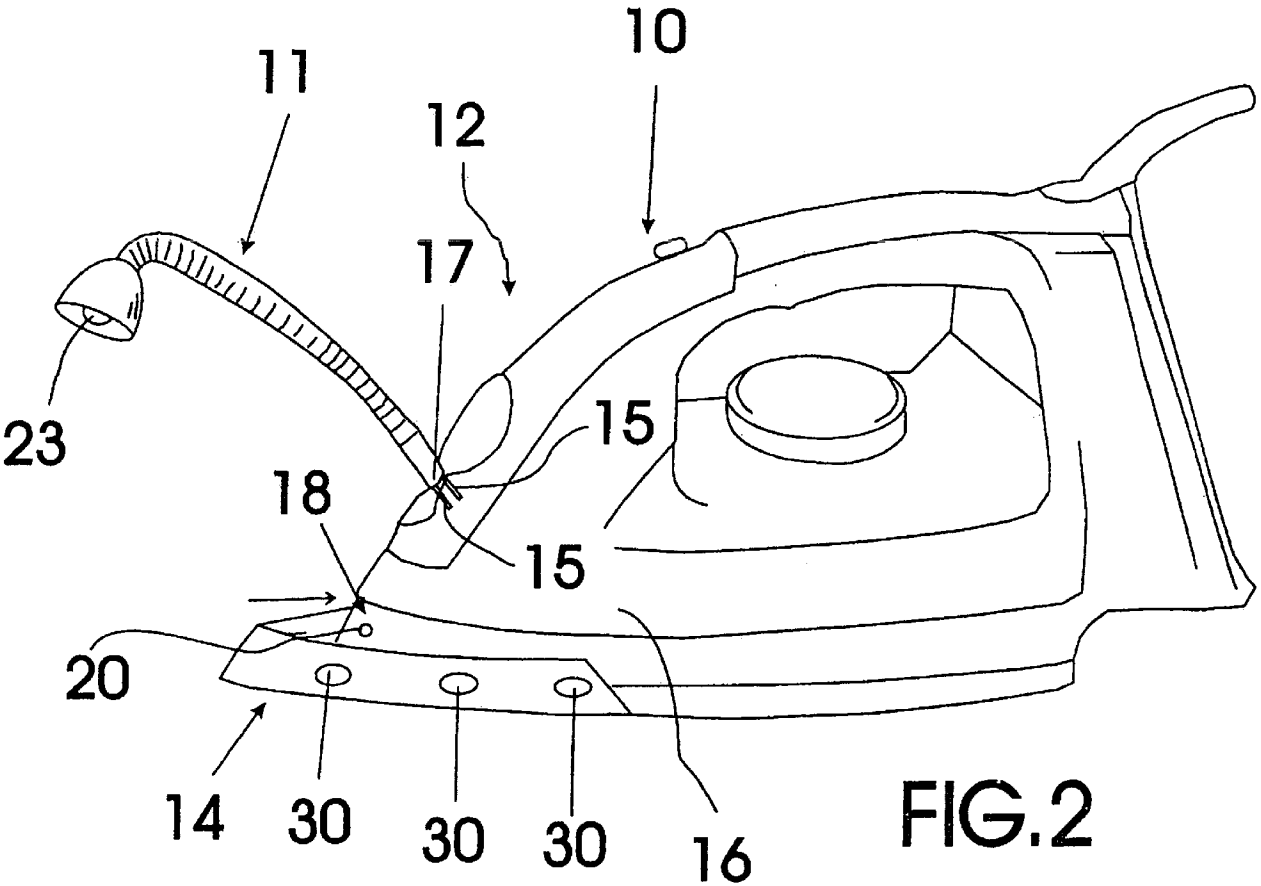
FIG. 2 is a perspective view of the clothing iron with detachable light assembly of the exemplary embodiment of the clothing iron with detachable light assembly of the present invention showing the clothing iron assembly with the detachable light assembly exploded out of connection with the light assembly mating recess of at the forward end of the clothing iron assembly.
Figure 3:
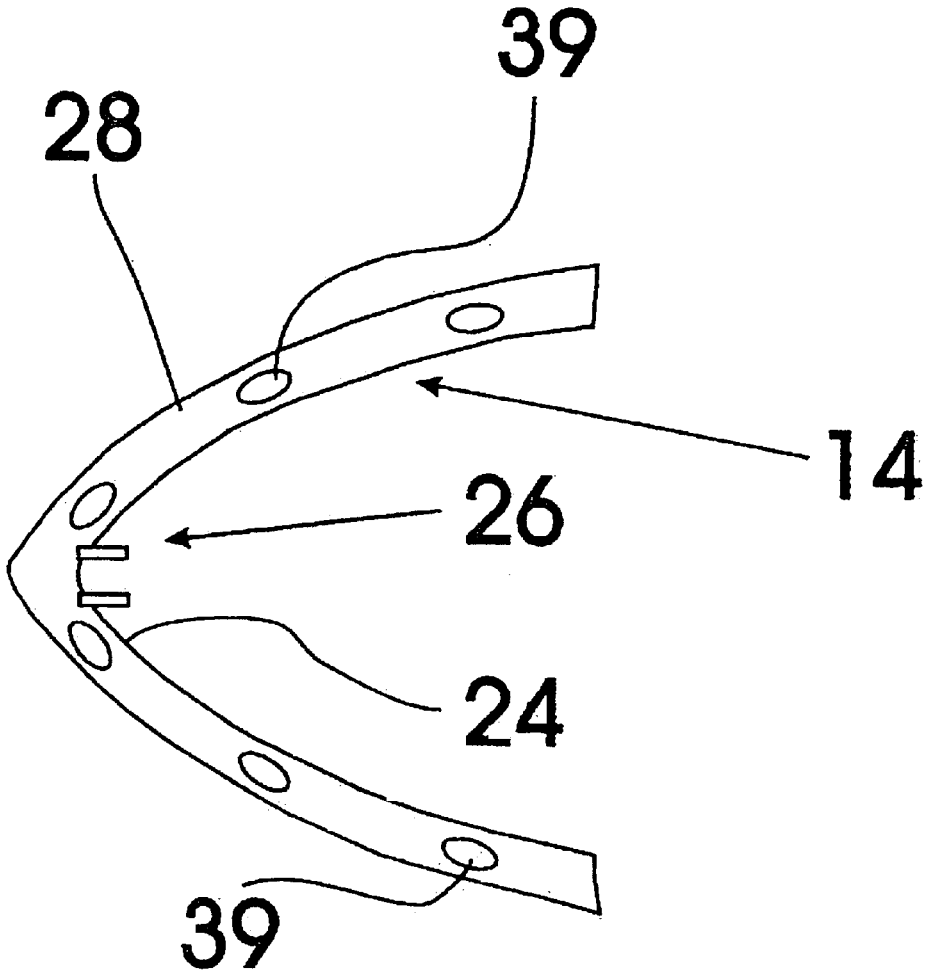
FIG. 3 is a top plan view of the clothing iron with detachable light assembly in isolation showing the two electrical connecting prongs that insert into the socket provided in the light assembly mating recess of at the forward end of the clothing iron assembly.

FIGS. 1–4 show various aspects of an exemplary embodiment of the clothing iron with detachable light assembly of the present invention generally designated 10. Clothing iron with detachable light assembly 10 includes a clothing iron assembly, generally designated 12; a goose-neck light assembly, generally designated 11; and a detachable light assembly, generally designated 14, secured to a forward end 16 of clothing iron assembly 12.

Clothing iron assembly 12 has a light assembly mating recess, generally designated 18, at forward end 16 thereof having a two socket jack 20 in connection therewith. Gooseneck light assembly 11 is detachable and has plug prongs 15 (shown in dashed lines) that plug into a socket 17. An on/off switch 21 is used to turn the bulb 23 of gooseneck light assembly 11 on and off. Detachable light assembly 14 is shaped to seat into light assembly mating recess 18 and has a two prong plug 26 extending from an iron facing surface 24 of a light assembly housing 28. Plug 26 is automatically positioned into electrical engagement with jack 20 of the iron assembly when the detachable light assembly 14 is seated in light assembly mating recess 18. Light assembly 14 has a number of high intensity, halogen bulbs 39 spaced there along so as to direct additional illumination onto an item being ironed. In addition, by using halogen bulbs 39, an additional benefit is derived from the radiant heat directed onto the area about to be ironed. This radiant heat, preheats the area about to be ironed and thereby reduces the time that the ironing surface 44 has to be placed onto the article being ironed.

It can be seen from the preceding description that a clothing iron with detachable light assembly has been provided.

It is noted that the embodiment of the clothing iron with detachable light assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A clothing iron with a detachable light assembly comprising:

a clothing iron assembly;

a goose-neck light assembly detachably mounted to the clothing iron assembly with plug prongs that plug into a socket of the clothing iron assembly; and a detachable light assembly secured to the forward end of the clothing iron assembly;

the clothing iron assembly having a light assembly mating recess at a forward end thereof having a jack in connection therewith;

the detachable light assembly being shaped to seat into the light assembly mating recess and having a plug extending therefrom that is positioned to electrically engage the jack of the iron assembly when the detachable light assembly is seated in the light assembly mating recess;

the light assembly having a number of spaced heat emitting high intensity bulbs so as to direct additional heat as well as illumination onto an item being ironed.

*2. A clothing iron with a detachable light assembly comprising:*

*a clothing iron assembly;*

*a light assembly detachably mounted to the clothing iron assembly; and*

*a second light assembly secured to the forward end of the clothing iron assembly;*

*the clothing iron assembly having a light assembly mating connection;*

*the detachable light assembly positioned to electrically engage said iron assembly;*

*the second light assembly having a plurality of spaced heat emitting bulbs so as to direct additional heat as well as illumination onto an item being ironed.*

*3. A clothing iron with a detachable light assembly comprising:*

*a clothing iron assembly;*

*a light assembly detachably mounted to the clothing iron assembly; and*

*a second light assembly secured to the clothing iron assembly;*

*the clothing iron assembly having a light assembly mating connection;*

*the detachable light assembly positioned to engage the iron assembly mating connection;*

*the second light assembly having two or more heat-emitting bulbs so as to direct additional heat as well as illumination onto an item being ironed.*

* * * * *